US012567650B2

(12) United States Patent (10) Patent No.: US 12,567,650 B2
Nishimori et al. (45) Date of Patent: Mar. 3, 2026

(54) SEPARATOR CONTAINING PARA-ARAMID FIBERS, AND ELECTROCHEMICAL DEVICE INCLUDING THE SAME

(71) Applicants:DUPONT SAFETY & CONSTRUCTION, INC., Wilmington, DE (US); Nippon K Nippon Kodoshi Ltd. (NKK), Kochi-City (JP)

(72) Inventors: Yuhei Nishimori, Kochi-City (JP); Gaku Matsuoka, Kochi-City (JP); Takumi Ichimura, Kochi-City (JP); Norihiro Wada, Kochi-City (JP)

(73) Assignees: DUPONT SAFETY & CONSTRUCTION, INC., Wilmington, DE (US); NIPPON KOSOSHI CORPORATION, Kochi-City (JP)

( * ) Notice: Subject to any disclaimer, the term of this patent is extended or adjusted under 35 U.S.C. 154(b) by 717 days.

(21) Appl. No.: 17/759,293

(22) PCT Filed: Jan. 25, 2021

(86) PCT No.: PCT/JP2021/002367
§ 371 (c)(1),
(2) Date: Jul. 22, 2022

(87) PCT Pub. No.: WO2021/149828
PCT Pub. Date: Jul. 29, 2021

(65) Prior Publication Data
US 2023/0089405 A1 Mar. 23, 2023

(30) Foreign Application Priority Data
Jan. 23, 2020 (JP) ................................. 2020-008927

(51) Int. Cl.
H01M 50/423 (2021.01)
H01M 10/0525 (2010.01)
H01M 50/491 (2021.01)

(52) U.S. Cl.
CPC ..... H01M 50/423 (2021.01); H01M 10/0525 (2013.01); H01M 50/491 (2021.01)

(58) Field of Classification Search
CPC ............. H01M 50/423; H01M 50/491; H01M 10/0525
USPC ......................................................... 429/247
See application file for complete search history.

(56) References Cited

U.S. PATENT DOCUMENTS

2015/0044574 A1* 2/2015 Cakmak ................ H01M 50/42
29/623.5

FOREIGN PATENT DOCUMENTS

| JP | H07-37571 U | | 7/1995 | |
|----|----|----|----|----|
| JP | 2005-268401 A | | 9/2005 | |
| JP | 2006049797 A | * | 2/2006 | |
| JP | 3777711 B2 | * | 5/2006 | |
| JP | 2010-53245 A | | 3/2010 | |
| JP | 2011-168048 A | | 9/2011 | |
| JP | 2012-221768 A | | 11/2012 | |
| JP | 2012-222266 A | | 11/2012 | |
| JP | 2013-139652 A | | 7/2013 | |
| JP | 2016-129094 A | | 7/2016 | |
| JP | 2002-266281 A | | 9/2022 | |
| WO | 2001/093350 A1 | | 3/2010 | |
| WO | WO-2011046066 A1 | * | 4/2011 | ............ H01M 2/145 |
| WO | 2017/57335 A1 | | 4/2017 | |

OTHER PUBLICATIONS

PCT International Search Report for Application No. PCT/JP2021/002367; ISA/JPA; Mar. 19, 2021.

* cited by examiner

*Primary Examiner* — Sean P Cullen

(57) ABSTRACT

This separator is for electrochemical elements, is to be interposed between a pair of electrodes, and includes para-aramid fibers for holding an electrolytic solution. The separator for electrochemical elements is characterized in that the contained amount of fibers having a fiber diameter of 0.03-0.50 μm is 90 mass % or more, the proportion of the number of fibers having a fiber length not less than 0.05 mm but less than 0.20 mm is 20-30%, and the proportion of the number of fibers having a fiber length not less than 0.20 mm but less than 5.00 mm is 70-80%.

7 Claims, No Drawings

SEPARATOR CONTAINING PARA-ARAMID FIBERS, AND ELECTROCHEMICAL DEVICE INCLUDING THE SAME

TECHNICAL FIELD

The present invention relates to a separator for a lithium-ion secondary battery as well as to a lithium-ion secondary battery using the separator.

BACKGROUND ART

Electrochemical elements, and lithium-ion secondary batteries in particular, have recently been used as power sources for electric vehicles and hybrid vehicles, and the market is expected to continue to expand because of more stringent environmental regulations for reducing $CO_2$ emissions, for example. The lithium-ion secondary batteries used for such on-board applications must be capable of faster charging/discharging, must have a higher capacity and longer life, and must be highly safe against explosion or ignition even under extreme conditions.

In electrochemical elements such as lithium-ion secondary batteries, the principal role of separators is to separate pairs of electrodes and to retain electrolyte. In order to separate pairs of electrodes, separators must have low resistance yet high shielding properties. In order to retain electrolyte, separators must also have high affinity for electrolytes. Low affinity for electrolytes results not only in poor battery output but also inadequate electrolyte retention and thus a short battery life. In order to meet recent demand for higher capacity, separators must also be even thinner.

Lowering separator resistance leads to more rapid lithium-ion battery charging/discharging and longer battery life. When batteries are charged or discharged, greater resistance results in greater loss. Heat is also generated by this loss, and the heat that is generated is another factor involved in shorter battery life.

Microporous polyolefin films made of polyethylene or polypropylene have conventionally been used as separators for lithium-ion secondary batteries. Non-woven fabric separators composed of beaten solvent-spun regenerated cellulose have also been used recently in response to demand for fast-charging and discharging batteries. To bring about faster-charging/discharging batteries, a variety of members such as electrode materials and electrolytes are being proactively improved, and the resistance in separators must be lowered even more.

One safety measure that has been adopted in lithium-ion secondary batteries is to ensure the safety of polyolefin microporous films by means of a function, known as the shutdown function. The shutdown function is the function of melting and closing up voids in the separator to increase the resistance and stop the cell reaction when a battery generates heat because of some abnormality. However, in cases where heat is generated too rapidly when a battery is overcharged or externally short-circuited, for example, the entire separator melts to a point where there is no longer a separator between the electrodes, potentially resulting in internal short circuiting and thermal runaway. This phenomenon is referred to as a meltdown.

As batteries used for on-board applications have a large capacity, a potentially life-threatening danger is that the battery could explode or ignite in the event of a meltdown. There has thus been recent demand for highly heat-resistant separators capable of ensuring that pairs of electrodes are separated even when heat is rapidly generated.

As noted above, heat-resistant separators that are thin and have low resistance yet high shielding properties, without leading to thermal runaway during rapid heat generation in batteries, are in demand as separators for lithium-ion secondary batteries.

The separators shown below have been proposed as separators for lithium-ion secondary batteries to date.

Patent Document 1 proposes a microporous polyolefin film. However, polyolefin resins have lower heat resistance than cellulose or aramids, for example, and rapid heat generation such as during overcharging or external short circuits may therefore result in meltdowns.

Patent Document 2 thus proposes a microporous polyolefin separator that is equipped with multiple layers on at least one side. However, a problem in both Patent Documents 1 and 2 is that the microporous polyolefin films have lower electrolyte affinity and fewer voids than separators composed of nonwoven fabric, resulting in poor electrolyte retention and poor battery cycling characteristics.

Patent Document 3 proposes a separator for an electrochemical element, in which the separator resistance is lowered by using solvent-spun regenerated cellulose fibers to control the average fiber diameter of beaten fibers and the separator tortuosity, resulting in better compactness, resistance, and electrolyte wetting properties. The solvent-spun regenerated cellulose fibers are beaten to obtain microfibrils that are less than 1 μm in diameter. The smaller fiber diameter results in a shorter ion conduction path and thus lower resistance. However, attempts to reduce the fiber diameter of the trunk portion of the solvent-spun regenerated cellulose fibers in order to further lower the resistance of the separator tend to result in a shorter fiber length. There may thus be less interlacing of long fibers, resulting in a separator with lower strength.

Cellulose also has no melting point and has higher heat resistance than polyolefin resins but starts to decompose at temperatures over 260° C., and there is thus a need for low-resistance separators that are even more heat resistant.

Patent Document 4 proposes a separator containing meta-aramid fibrids and heat-resistant short fibers that has better heat resistance. Fibrids are synthetic pulp-like particles, which are obtained by coagulating and precipitating a polymer solution while stirred at high speed in a precipitant. Fibrids are in the form of micro-pulp and can thus be included in separators to enhance the shielding properties. However, fibrids come into close contact with each other and close up the pores, resulting in a reduced ion conduction path and poor resistance. A resulting problem is that low resistance and good shielding properties cannot both be provided at the same time.

Patent Document 5 proposes a non-woven fabric that is composed of aramid microfibers. A high-strength aramid fiber nonwoven fabric can be obtained by spinning aramid microfibers and stretching a web thereof. However, the attempt to spin a fiber diameter lower than 0.5 μm in order to reduce separator resistance leads to a loss of single-fiber strength, and a resulting problem is that the strength is less effectively increased and the separator is not as strong.

PRIOR ART DOCUMENTS

Patent Documents

Patent Document 1: Japanese Unexamined Patent Publication No. 2010-53245
Patent Document 2: Japanese Unexamined Patent Publication No. 2011-168048

Patent Document 3: International Patent Publication No. 2017/57335

Patent Document 4: Japanese Unexamined Patent Publication No. H07-37571

Patent Document 5: Japanese Unexamined Patent Publication No. 2013-139652

SUMMARY OF THE INVENTION

Problems to be Solved by the Invention

To date, aramid fibrids and binder fibers, etc., have been added, without controlling the fiber diameter and percentage of microfibers, to separators composed of aramid fibers to ensure enough strength to avoid breaking during battery production. However, fibrids and binder fibers come into close contact with each other and close up the pores, resulting in a reduced ion conduction path and poor resistance.

It has also been difficult for conventional cellulose fiber separators to satisfactorily meet all recent demand for shielding properties, resistance, and strength. Reducing the diameter of solvent-spun regenerated cellulose fibers in order to meet the requirement for even lower resistance also results in shorter fiber length and thus less interlacing of fibers and lower separator strength.

Para-aramid fibers are rigid and have high strength, and are thus less likely to be made into short fibers/microfibers when beaten compared with cellulose fibers. Methods for making them into micro-pulp, in the manner of aramid fibrids, have thus been studied so far.

In view of the problems noted above, an object of the present invention is to provide a separator in which such problems have been solved. Specifically, the separator of the present invention is intended to provide a heat-resistant separator for a lithium-ion secondary battery, that has low resistance yet better strength and shielding properties, where the rapid generation of heat in the battery will not lead to thermal runaway. The use of the separator is also intended to make it possible to allow lithium-ion secondary batteries to be faster charging/discharging, have a higher capacity and a longer life, and to be safer against explosion or ignition.

Means for Solving the Problems

As a result of extensive research, the inventors discovered that rigid, high-strength para-aramid fibers can be beaten into short fibers/microfibers, thereby enhancing the shielding properties and reducing the resistance of separators.

As means for solving the above problems and achieving the above objects, the present invention comprises the following features.

Specifically, the present invention is a separator for an electrochemical element that comprises para-aramid fibers for retaining an electrolyte and that is interposed between a pair of electrodes, characterized in that the content of fibers 0.03 to 0.50 μm in diameter is 90% by mass or more, the proportion of the number of fibers 0.05 mm to less than 0.20 mm in length is 20 to 30%, and the proportion of the number of fibers 0.20 mm to less than 5.00 mm in length is 70 to 80%.

For example, the separator is preferably 10 to 30 μm thick, the porosity is preferably 50 to 80%, the maximum pore diameter is preferably 0.15 to 0.40 μm, and the mean fiber length is preferably 0.7 to 1.0 mm.

The present invention is also characterized by being an electrochemical device utilizing the above separator for an electrochemical device. The electrochemical element of the present invention is preferably a lithium ion-secondary battery.

Effect of the Invention

According to the present invention, para-amid fibers are used, and the fiber diameter and the proportion of microfibers are controlled, thereby making it possible to provide a separator for a heat-resistant lithium-ion secondary battery that has low resistance yet exceptional strength and shielding properties, where the rapid generation of heat in the battery will not lead to thermal runaway. The separator can also be used to provide a lithium-ion secondary battery that is capable of faster charging/discharging, has a higher capacity and a longer life, and is safer against explosion or ignition.

MODES FOR CARRYING OUT THE INVENTION

Examples of embodiments for working one aspect according to the present invention are described in detail below.

The separator of the present invention comprises para-aramid fibers. The separator of the present invention may include other synthetic fibers such as meta-aramid fibers or fluorofibers, or natural fibers such as cellulose fibers, in addition to para-aramid fibers, but is preferably composed of a high proportion of para-aramid fibers, such as 80% by mass or more, 90% by mass or more, 95% by mass or more, 98% by mass or more, 99% by mass or more, and even more preferably 100% by mass. The separator of the present invention is preferably composed substantially of para-aramid fibers, in the sense that other fibers are not included in an amount that would affect the properties of the para-aramid fibers in terms of the invention; the separator of the present invention is even more preferably composed of para-aramid fibers.

Compared with meta-aramid fibers, para-aramid fibers are rigid, have a highly linear molecular skeleton, and have better fiber properties such as high strength and high elasticity. Aramid fibers are also far more heat resistant than other synthetic fibers, and can be used to enhance the heat resistance of separators. They also have very high affinity for the carbonate solvents that are used in the electrolytes of lithium-ion secondary batteries.

Cellulose has no melting point and has higher heat resistance than polyolefin resins but starts to decompose at temperatures over 260° C., resulting in the possibility of inadequate heat resistance, an important feature in terms of stability at elevated temperatures. In that regard, para-aramid has no melting point and decomposes at temperatures over 500° C. and is thus more desirable than cellulose because of its high heat resistance.

For the same reasons as the cellulose fibers noted above, para-aramid fibers are more desirable in terms of heat resistance compared with other natural fibers or synthetic fibers other than aramid fibers. Fluorofibers are an example of other fibers having heat resistance comparable to that of aramid fibers, but para-aramid fibers are more suitable as fibers for making separators because of their compatibility with electrolytes.

The separator of the present invention contains fibers 0.03 to 0.50 μm in diameter in an amount of 90% by mass or more, preferably 94% by mass or more, more preferably 96% by mass or more, and in particular more preferably 97% by mass or more. Establishing the content of fibers 0.03 to 0.50 μm in diameter to the above values allows both low resistance and shielding properties to be achieved. A greater proportion of fibers larger than 0.50 μm in diameter will result in a longer ion conduction path in places where the fibers are thicker and in poor resistance, and thus in poor battery resistance. Fibers also cannot actually be made smaller than 0.03 μm in diameter.

Methods for determining fiber diameter by electron microscopy are conventionally known. However, in this method, microfibers such as cellulose nanofibers must be observed at high magnification when determining the diameter. When microfibers are observed at high magnification, the observation field of view is narrow, necessitating numerous measurements in order to obtain information on the separator as a whole. Measured values may also differ depending on who takes the measurements and when the measurements are taken, and the method cannot be considered to be characterized by highly reproducible accuracy. Fiber length analyzers capable of measuring fiber width (fiber diameter) are also commercially available, but the devices take optical measurements using a CCD camera, for example, and the resolution is thus lower than that of electron microscopes, making them unsuitable for determining the diameter of microfibers less than 1 μm in diameter.

The fiber diameter in the present invention should thus be determined using a method that is based on centrifugal sedimentation to ensure highly accurate measurement. Centrifugal sedimentation is a method that is used to measure the particle size distribution of spherical substances, as specified in JIS Z8823-2 {Determination of particle size distribution by centrifugal liquid sedimentation methods, Part 2: Photo-centrifuge method.} This method can be used to determine extremely fine fiber diameters of 1 μm or less.

The proportion of fibers 0.03 to 0.50 μm in diameter can also be determined based on the measured data by dividing the total weight-weighted content of fibers within the range of 0.03 to 0.50 μm by the total weight-weighted content in all measured ranges.

In the separator of the present invention, the proportion of the number of fibers 0.05 mm to less than 0.20 mm in diameter is 20 to 30%, preferably 24 to 30%, more preferably 26 to 30%, and in particular preferably 28 to 30%, and the proportion of the number of fibers 0.20 mm to less than 5.00 mm in length is 70 to 80%, preferably 70 to 76%, more preferably 70 to 74%, and in particular preferably 70 to 72%. The range noted above was established to allow the shielding properties to be enhanced without compromising the strength of the separator.

When the proportion of the number of fibers 0.05 mm to less than 0.20 mm in length is lower than 20% and the proportion of the number of fibers 0.20 to 5.00 mm in length is greater than 80%, there will be more long fibers than short fibers, resulting in a loss of separator shielding properties and in the danger of the battery shorting out. When the proportion of the number of fibers 0.05 mm to less than 0.20 mm in length is greater than 30% and the proportion of the number of fibers 0.20 mm to less than 5.00 mm in length is less than 70%, there will be more short fibers, resulting in less interlacing of long fibers and thus a loss of separator strength as well as the danger of winding failure due to separator breakage during the battery production process. The inclusion of fibers 5.00 mm in length or more will also compromise the uniformity of the texture, with less local interlacing in some places, which tends to result in a weaker separator. This will result in the danger of winding failure due to separator breakage in the battery production process.

The proportion of the number of fibers 0.05 mm to less than 5.0 mm in length in the length-weighted fiber length distribution in the present embodiment can be determined using the Kajaani FiberLab Analyzer (by Metso Automation) in accordance with JIS P 8226-2 "Pulps—Determination of fiber length by automated optical analysis, Part 2: Unpolarized light method" (ISO 16065-2), where the number of fibers of the length-weighted calculated length is divided by the number of all measured fibers to obtain the proportion of the number of fibers, expressed as a percentage.

Para-aramid fibers suitable for the fiber diameter and fiber length of the separator of the present invention are not particularly limited, and examples that can be used include para-aramids such as polypara-phenylene terephthalamide, poly(para-phenylene-4,4'-biphenylene-dicarboxylic amide), poly(para-phenylene-2,6-naphthalenedicarboxylic amide), or those copolymerized with a given amount (such as less than 10% by weight) of a diamine or diacid chloride, but polypara-phenylene terephthalamide-based para-aramid fibers spun with the addition of polyvinylpyrrolidone, for example, are preferred. The para-aramid fibers can be beaten to obtain a separator that is suitable for the present invention. Making fibers into pulp is called beating (refining), and beaters are called refiners. Beating is generally done for 3 purposes: fiber swelling, fiber cutting, and fiber fibrillation. Beating undertaken primarily for fiber cutting is called free beating, and beating undertaken primarily for fiber fibrillation is called wet beating. The type of refiner, blade shape, and operating conditions, for example, that are selected will differ depending on which beating method is used. For example, conventionally used equipment such as single-disk refiners, double-disk refiners, or PFI mills can be used for beating without any particular limitations. When a PFI mill, which is a beater, is used, for example, the above-mentioned para-aramid fibers brought to a sample concentration of 5% with the addition of pure water can be beaten and wet-laid using a standard PFI mill (by KUMAGAI RIKI KOGYO Co., Ltd.), with a 0.1 mm distance between the roll and housing, in accordance with JIS P 8221-2 "Pulps—Laboratory beating, Part 2: PFI mill method" (ISO 5264-2), to obtain a separator suitable for the present invention. The beater and beating conditions are not particularly limited, provided that the content of fibers 0.03 to 0.50 μm in diameter is 90% by mass or more, the proportion of the number of fibers 0.05 mm to less than 0.20 mm in length is 20 to 30%, and the proportion of the number of fibers 0.20 mm to less than 5.00 mm in length is 70 to 80%. The invention need not be limited to polypara-phenylene terephthalamide-based para-aramid fibers spun with the addition of polyvinylpyrrolidone, provided that the content of fibers 0.03 to 0.50 μm in diameter is 90% by mass or more, the proportion of the number of fibers 0.05 mm to less than 0.20 mm in length is 20 to 30%, and the proportion of the number of fibers 0.20 mm to less than 5.00 mm in length is 70 to 80%.

The thickness of the separator of the present embodiment is preferably 5 to 35 μm, more preferably 7 to 30 μm, and in particular preferably 10 to 20 μm. A separator that is less than 5 μm thick will result in a loss of separator strength and thus the danger of winding failure due to separator breakage during the battery production process, as well as a loss of separator shielding properties and thus the danger of the battery shorting out. A thickness greater than 35 μm will result in a longer distance between the battery electrodes and thus a battery with poor internal resistance. Thick separators will also make it difficult to obtain a more compact battery with a higher capacity.

The separator has a porosity of preferably 45 to 85%, more preferably 50 to 80%, and in particular preferably 60 to 75%. A porosity of less than 45% will result in a smaller ion conduction path or electrolyte retention and thus in poor battery resistance and life. A porosity greater than 85% will result in a loss of separator shielding properties and thus the danger of the battery shorting out.

The basis weight of the separator of the present embodiment is preferably 4 to 24 g/m², more preferably 4 to 16 g/m², and in particular preferably 4 to 10 g/m². A basis weight under 4 g/m² will result in a lower amount of fibers per unit volume and thus a loss of separator strength and the danger of winding failure due to separator breakage in the battery production process. A basis weight of 24 g/m² or more will result in a greater amount of fibers per unit volume and thus poor internal battery resistance.

The maximum pore diameter of the separator is preferably 0.10 to 0.45 µm, more preferably 0.15 to 0.40 µm, and in particular preferably 0.30 to 0.40 µm. A maximum pore diameter of less than 0.10 µm will result in a separator with smaller pore diameters and poor ion conduction, and thus poor battery resistance. A maximum pore diameter greater than 0.45 µm will tend to result in shorts.

In the interests of separator strength, the length-weighted average fiber length of the para-aramid fibers forming the separator is preferably 0.6 to 1.2 mm, more preferably 0.7 to 1.0 mm, and in particular preferably 0.7 to 0.9 mm. The length-weighted average fiber length here is a value containing no fibers shorter than 0.2 mm, as specified in JIS P 8226-2 "Pulps—Determination of fiber length by automated optical analysis, Part 2: Unpolarized light method" (ISO 16065-2).

An average fiber length shorter than 0.6 mm will result in a shorter fiber length and thus weaker wet-laid strength, leading to the possibility that a separator cannot be produced during the paper-making process. Even if a separator could be produced, the loss of strength may result in separator breakage during the battery production process. An average fiber length greater than 1.2 mm will compromise the uniformity of the texture, resulting in less local interlacing in some places, which tends to result in a weaker separator. This will result in the danger of winding failure due to separator breakage during the battery production process.

The separator can be in the form of a wet nonwoven fabric produced by any method such as a spunlace manufacturing method, an air-through manufacturing method, or a paper-making method, although the wet nonwoven fabric is preferably formed by a paper-making method, for example. Fourdrinier paper-making, tanmo (short fourdrinier) paper-making, cylinder paper-making, and combinations thereof are examples of papermaking methods that can be used without limitation to form a sheet. Layers formed by fourdrinier or tanmo paper-making are preferred because extremely fine, short fibers are easily obtained. After the sheet has been formed, the thickness and porosity may be adjusted by a calendaring processing.

The sheet forming means and papermaking method are not particularly limited, provided that it is possible to produce a separator in which the content of fibers 0.03 to 0.50 µm in diameter is 90% by mass or more, the proportion of the number of fibers 0.05 mm to less than 0.20 mm in length is 20 to 30%, and the proportion of the number of fibers 0.20 mm to less than 5.00 mm in length is 70 to 80%.

The use of the above features in the present embodiment can provide a heat-resistant separator for a lithium-ion secondary battery that has low resistance yet better strength and shielding properties, where the rapid generation of heat in the battery will not lead to thermal runaway. The separator can also be used to provide a lithium-ion secondary battery that is capable of faster charging/discharging, has a higher capacity and a longer life, and is safer against explosion or ignition.

The lithium-ion secondary battery using the separator for an electrochemical element of the present invention can be formed by allowing an organic electrolyte to impregnate and be retained by the separator component, and by using the separator to separate the two electrodes. The electrode used as the positive electrode is generally one in which lithium cobalt oxide, lithium nickel oxide, lithium manganate, or a combination thereof is applied and allowed to adhere by means of a binder to a metal foil surface (current collector). The electrode used as the negative electrode is generally one in which black lead or graphite is applied and allowed to adhere by means of a binder to a metal foil surface (current collector). The organic electrolyte generally comprises lithium ion and a tetrafluoroborate, hexafluorophosphate, trifluoromethanesulfonic acid, or other anion salt dissolved in an organic solvent such as propylene carbonate, ethylene carbonate, dimethyl carbonate, diethyl carbonate, or ethyl methyl carbonate. However, the two electrodes and the electrolyte are not limited to the above examples or combinations thereof, and may be any that are commonly used.

EXAMPLES

The properties of the separator for an electrochemical device (referred to below simply as "separator") in the present embodiment were specifically determined under the following conditions and by the following methods.

[Thickness]

Separator thickness was determined in accordance with "JIS C 2300-2 Cellulosic papers for electrical purposes, Part 2: Methods of test, 5.1 Thickness" using the micrometer specified in "5.1.1 Instruments and Methods, a) When using an external micrometer" and by folding the separator in 10 per "5.1.3 When determining thickness by folding sheets of paper."

[Density]

Separator density was determined in accordance with the method specified in Method B of "JIS C 2300-2 Cellulosic papers for electrical purposes, Part 2: Methods of test, 7.0 A Density."

[Porosity]

The porosity was calculated, using the following formula 1, from the ratio between the separator density and the specific gravity of the material forming the separator.

$$\text{Porosity} = (1-(D1/D2)) \times 100 \qquad \text{Formula 1:}$$

Here, D1 is the separator density, and D2 is the specific gravity of the material forming the separator.

[Fiber Diameter]

The fiber diameter and fiber diameter proportions were determined using a particle size distribution analyzer (CPS Disc Centrifuge, by Nihon Rufuto Co., Ltd.), a device specified in JIS Z 8823-2 "Determination of particle size distribution by centrifugal liquid sedimentation methods, Part 2: Photocentrifuge method."

[Fiber Length]

The average fiber length and fiber length proportions were determined using the Kajaani FiberLab Analyzer (by Metso Automation), a device specified in JIS P 8226-2 "Pulps—Determination of fiber length by automated optical analysis, Part 2: Unpolarized light method" (ISO 16065-2). Fibers shorter than 0.2 mm are not included in the calculation of the average fiber length per JIS-P8226-2.

[Maximum Diameter]

The maximum pore diameter was determined using the device specified (the capillary flow meter CFP-1200-AEXL-ESA (by Porous Materials, Inc.) was used in the present embodiment) in "ASTM F316-03, JIS K 3832 Testing Methods for Bubble Point of Membrane Filters, 3.(1) Filter Disk Bubble Point Analyzer." GALWICK (by Porous Materials, Inc.) was used as the test solution.

[Production of Lithium-Ion Secondary Battery]

A commercially available lithium cobalt oxide electrode for a lithium-ion secondary battery was used as the positive electrode, and a commercially available graphite electrode for a lithium-ion secondary battery was used as the negative electrode. This pair of electrodes was wound, with the separator interposed therebetween, to form a lithium-ion secondary battery element, which was housed in a bottomed cylindrical aluminum case, an electrolyte comprising 1 mol/L of lithium trifluoromethanesulfonate dissolved as the electrolyte in propylene carbonate solvent was introduced therein, and the case was sealed using a press, giving a lithium-ion secondary battery having a rated voltage of 4.2 V and a discharge capacity of 500 mAh.

[Lithium-Ion Secondary Battery Production Efficiency]

The number of times separators broke under the same production conditions during the production of the lithium-ion secondary batteries was divided by the number of batteries that were produced to determine the winding failure rate.

[Assessment of Lithium-Ion Secondary Batteries]

[Resistance]

Internal resistance was determined in accordance with "6.5.2 AC Internal Resistance" specified in "JIS C 8715-1 Secondary lithium cells and batteries for use in industrial applications, Part 1: Tests and requirements of performance."

[Short Failure Rate]

Short failure was defined as when the charging voltage did not reach the rated voltage, where the battery short failure rate, expressed as a percentage, was determined by dividing the number of batteries with such short failures divided by the number of batteries that had been produced.

[Overcharging Failure Rate]

The overcharging failure rate was used as an indicator of the separator shielding properties. This test was conducted in order to quantify differences in separator shielding properties that do not show up in the usual short failure tests.

Specifically, failure was defined as the failure of the charging voltage to meet the rated voltage when a lithium-ion secondary battery that had been produced was charged at a constant current to 5.0 V over a 3-hour period at a rate of 1.0 C at 60° C., where the overcharging failure rate, expressed as a percentage, was determined by dividing the number of lithium-ion secondary batteries with such failures by the number of tested lithium-ion secondary batteries.

[Heat Resistance]

Five fully charged batteries were placed in a constant temperature bath and were heated at a constant rate to 230° C. over a 30-minute period and held for 1 hour at 230° C. The number of batteries that ignited and began to smoke during that time was counted. Cases where more than 1 battery ignited or began to smoke were rated X, and cases where 0 batteries did so were rated O.

Specific examples of an embodiment for working one aspect according to the present invention are described in detail below.

Non-woven fabric for the separators of these examples was obtained by a paper-making method using para-aramid fibers with a fourdrinier paper-making machine or a tanmo paper-making machine. Specifically, the separators were composed of a wet nonwoven fabric.

Example 1

Para-aramid fibers (polypara-phenylene terephthalamide; 1.7 dtex) were beaten and then processed by fourdrinier paper-making to obtain a separator in which the content of fibers 0.03 to 0.50 μm in diameter was 90.2% by mass, the proportion of fibers 0.05 mm to less than 0.20 mm in length was 24.5%, and the proportion of fibers 0.20 mm to less than 5.00 mm in length was 75.5%. The separator was 25 μm thick, with a density of 0.43 g/cm³, a basis weight of 10.8 g/m², a porosity of 70%, a maximum pore diameter of 0.36 μm, and an average fiber length of 0.95 mm.

Example 2

Beaten para-amid fibers were processed by fourdrinier paper-making and then calendared to obtain a separator in which the content of fibers 0.03 to 0.50 μm in diameter was 90.3% by mass, the proportion of fibers 0.05 mm to less than 0.20 mm in length was 20.1%, and the proportion of fibers 0.20 mm to less than 5.00 mm in length was 79.9%. The separator was 30 μm thick, with a density of 0.72 g/cm³, a basis weight of 21.6 g/m², a porosity of 50%, a maximum pore diameter of 0.15 μm, and an average fiber length of 1.00 mm.

Example 3

Beaten para-amid fibers were processed by fourdrinier paper-making to obtain a separator in which the content of fibers 0.03 to 0.50 μm in diameter was 97.4% by mass, the proportion of fibers 0.05 mm to less than 0.20 mm in length was 29.5%, and the proportion of fibers 0.20 mm to less than 5.00 mm in length was 70.5%. The separator was 17 μm thick, with a density of 0.29 g/cm³, a basis weight of 4.9 g/m², a porosity of 80%, a maximum pore diameter of 0.37 μm, and an average fiber length of 0.70 mm.

Example 4

Beaten para-amid fibers were processed by fourdrinier paper-making and then calendared to obtain a separator in which the content of fibers 0.03 to 0.50 μm in diameter was 90.2% by mass, the proportion of fibers 0.05 mm to less than 0.20 mm in length was 20.3%, and the proportion of fibers 0.20 mm to less than 5.00 mm in length was 79.7%. The separator was 32 μm thick, with a density of 0.75 g/cm³, a basis weight of 24.0 g/m², a porosity of 48%, a maximum pore diameter of 0.13 μm, and an average fiber length of 1.10 mm.

Example 5

Beaten para-amid fibers were processed by fourdrinier paper-making to obtain a separator in which the content of fibers 0.03 to 0.50 μm in diameter was 97.5% by mass, the proportion of fibers 0.05 mm to less than 0.20 mm in length was 29.2%, and the proportion of fibers 0.20 mm to less than 5.00 mm in length was 70.8%. The separator was 17 μm thick, with a density of 0.25 g/cm³, a basis weight of 4.2 g/m², a porosity of 83%, a maximum pore diameter of 0.42 μm, and an average fiber length of 0.70 mm.

Example 6

Beaten para-amid fibers were processed by fourdrinier paper-making to obtain a separator in which the content of fibers 0.03 to 0.50 μm in diameter was 97.6% by mass, the proportion of fibers 0.05 mm to less than 0.20 mm in length was 29.6%, and the proportion of fibers 0.20 mm to less than 5.00 mm in length was 70.4%. The separator was 8 μm thick, with a density of 0.50 g/cm³, a basis weight of 4.0 g/m², a porosity of 65%, a maximum pore diameter of 0.32 μm, and an average fiber length of 0.68 mm.

Example 7

Beaten para-amid fibers were processed by fourdrinier paper-making to obtain a separator in which the content of fibers 0.03 to 0.50 μm in diameter was 97.5% by mass, the proportion of fibers 0.05 mm to less than 0.20 mm in length was 29.5%, and the proportion of fibers 0.20 mm to less than 5.00 mm in length was 70.5%. The separator was 10 μm thick, with a density of 0.40 g/cm³, a basis weight of 4.0 g/m², a porosity of 72%, a maximum pore diameter of 0.38 μm, and an average fiber length of 0.70 mm.

Comparative Example 1

Beaten para-amid fibers were processed by fourdrinier paper-making to obtain a separator in which the content of fibers 0.03 to 0.50 μm in diameter was 85.2% by mass, the proportion of fibers 0.05 mm to less than 0.20 mm in length was 20.3%, and the proportion of fibers 0.20 mm to less than 5.00 mm in length was 79.7%. The separator was 25 μm thick, with a density of 0.43 g/cm³, a basis weight of 10.8 g/m², a porosity of 70%, a maximum pore diameter of 0.45 μm, and an average fiber length of 0.98 mm.

Comparative Example 2

Beaten para-amid fibers were processed by fourdrinier paper-making and then calendared to obtain a separator in which the content of fibers 0.03 to 0.50 μm in diameter was 90.1% by mass, the proportion of fibers 0.05 mm to less than 0.20 mm in length was 17.9%, and the proportion of fibers 0.20 mm to less than 5.00 mm in length was 82.1%. The separator was 30 μm thick, with a density of 0.72 g/cm³, a basis weight of 21.6 g/m², a porosity of 50%, a maximum pore diameter of 0.17 μm, and an average fiber length of 1.00 mm.

Comparative Example 3

Beaten para-amid fibers were processed by fourdrinier paper-making to obtain a separator in which the content of fibers 0.03 to 0.50 μm in diameter was 98.7% by mass, the proportion of fibers 0.05 mm to less than 0.20 mm in length was 32.7%, and the proportion of fibers 0.20 mm to less than 5.00 mm in length was 67.3%. The separator was 17 μm thick, with a density of 0.29 g/cm³, a basis weight of 4.9 g/m², a porosity of 80%, a maximum pore diameter of 0.40 μm, and an average fiber length of 0.70 mm.

Comparative Example 4

Starting material comprising a mixture of 70% by mass of beaten para-aramid fibers and 30% by mass of beaten lyocell fibers (solvent-spun regenerated cellulose fibers) was processed by fourdrinier paper-making to obtain a separator in which the content of fibers 0.03 to 0.50 μm in diameter was 74.1% by mass, the proportion of fibers 0.05 mm to less than 0.20 mm in length was 20.4%, and the proportion of fibers 0.20 mm to less than 5.00 mm in length was 79.6%. The separator was 25 μm thick, with a density of 0.43 g/cm³, a basis weight of 10.8 g/m², a porosity of 70%, a maximum pore diameter of 0.45 μm, and an average fiber length of 0.90 mm.

Comparative Example 5

Starting material comprising a mixture of 70% by mass of beaten para-aramid fibers and 30% by mass of PET fibers 3 μm in diameter was processed by fourdrinier paper-making to obtain a separator in which the content of fibers 0.03 to 0.50 μm in diameter was 63.4% by mass, the proportion of fibers 0.05 mm to less than 0.20 mm in length was 14.5%, and the proportion of fibers 0.20 mm to less than 5.00 mm in length was 85.5%. The separator was 25 μm thick, with a density of 0.43 g/cm³, a basis weight of 10.8 g/m², a porosity of 70%, a maximum pore diameter of 0.52 μm, and an average fiber length of 0.95 mm.

Comparative Example 6

Beaten meta-amid fibers were processed by fourdrinier paper-making to obtain a separator in which the content of fibers 0.03 to 0.50 μm in diameter was 0% by mass, the proportion of fibers 0.05 mm to less than 0.20 mm in length was 0%, and the proportion of fibers 0.20 mm to less than 5.00 mm in length was 100%. The separator was 50 μm thick, with a density of 0.35 g/cm³, a basis weight of 17.5 g/m², a porosity of 76%, a maximum pore diameter of 3.40 μm, and an average fiber length of 1.20 mm.

Conventional Example 1

A microporous polyethylene film was used as the separator. The separator was 20 μm thick, with a density of 0.57 g/cm³, a basis weight of 11.4 g/m², a porosity of 40%, and a maximum pore diameter of 0.05 μm.

Conventional Example 2

A microporous polypropylene film was used as the separator. The separator was 25 μm thick, with a density of 0.50 g/cm³, a basis weight of 12.5 g/m², a porosity of 45%, and a maximum pore diameter of 0.06 μm.

Conventional Example 3

Beaten solvent-spun regenerated cellulose fibers were processed by fourdrinier paper-making to obtain a separator in which the content of fibers 0.03 to 0.50 μm in diameter was 37.5% by mass, the proportion of fibers 0.05 mm to less than 0.20 mm in length was 5.2%, and the proportion of fibers 0.20 mm to less than 5.00 mm in length was 94.8%. The separator was 20 μm thick, with a density of 0.45 g/cm³, a basis weight of 9.0 g/m², a porosity of 70%, a maximum pore diameter of 0.90 μm, and an average fiber length of 0.78 mm.

Conventional Example 4

Starting material comprising a mixture of 70% by mass of meta-aramid fibers and 30% by mass of meta-aramid fibrids was processed by fourdrinier paper-making to obtain a separator. The separator was 40 μm thick, with a density of 0.40 g/cm³, a basis weight of 16.0 g/m², a porosity of 72%, and a maximum pore diameter of 2.00 μm.

The following table presents the structure, properties, lithium-ion secondary battery production efficiency, and assessment results of the lithium-ion batteries obtained in each example of Examples 1 through 7, Comparative Examples 1 through 6, and Conventional Examples 1 through 4 above.

TABLE 1

| | Separator | | | | | | | |
|---|---|---|---|---|---|---|---|---|
| | Type of fiber | Proportion % by mass | Fiber diameter 0.03-0.5 μm % by mass | Fiber length 0.05-0.20 mm % | Fiber length 0.2-5.0 mm % | Average fiber length mm | Thickness μm | Density g/m³ |
| Example 1 | Para-aramid | 100 | 90.2 | 24.5 | 75.5 | 0.95 | 25 | 0.43 |
| Example 2 | Para-aramid | 100 | 90.3 | 20.1 | 79.9 | 1.00 | 30 | 0.72 |
| Example 3 | Para-aramid | 100 | 97.4 | 29.5 | 70.5 | 0.70 | 17 | 0.29 |
| Example 4 | Para-aramid | 100 | 90.2 | 20.3 | 79.7 | 1.10 | 32 | 0.75 |
| Example 5 | Para-aramid | 100 | 97.5 | 29.2 | 70.8 | 0.70 | 17 | 0.25 |
| Example 6 | Para-aramid | 100 | 97.6 | 29.6 | 70.4 | 0.68 | 8 | 0.50 |
| Example 7 | Para-aramid | 100 | 97.5 | 29.5 | 70.5 | 0.70 | 10 | 0.40 |
| Comparative Example 1 | Para-aramid | 100 | 85.2 | 20.3 | 79.7 | 0.98 | 25 | 0.43 |
| Comparative Example 2 | Para-aramid | 100 | 90.1 | 17.9 | 82.1 | 1.00 | 30 | 0.72 |
| Comparative Example 3 | Para-aramid | 100 | 98.7 | 32.7 | 67.3 | 0.70 | 17 | 0.29 |
| Comparative Example 4 | Para-aramid and lvocell | 70 30 | 74.3 | 20.4 | 79.6 | 0.90 | 25 | 0.43 |
| Comparative Example 5 | Para-aramid and PET | 70 30 | 63.4 | 14.5 | 85.5 | 0.95 | 25 | 0.43 |
| Comparative Example 6 | Meta-aramid | 100 | 0 | 0 | 100 | 1.20 | 50 | 0.35 |
| Conventional Example 1 | Microporous PE film | | | — | | | 20 | |
| Conventional Example 2 | Microporous PP film | | | — | | | 25 | |
| Example 4 | Lyccel | 100 | 37.5 | 5.2 | 94.8 | 0.78 | 20 | 0.45 |
| Conventional Example 5 | Para-aramid and fibrids | 70 30 | | — | | | 40 | |

| | Separator | | Battery Test | | | | |
|---|---|---|---|---|---|---|---|
| | Porosity % | Maximum pore diameter μm | Winding failure rate % | Resistance mΩ | Failure rate % | Over-charging failure rate % | Heat resistance |
| Example 1 | 70 | 0.36 | 0.0 | 30 | 0.0 | 0.0 | ○ |
| Example 2 | 50 | 0.15 | 0.0 | 45 | 0.0 | 0.0 | ○ |
| Example 3 | 80 | 0.37 | 0.0 | 23 | 0.0 | 0.0 | ○ |
| Example 4 | 48 | 0.13 | 0.1 | 48 | 0.0 | 0.0 | ○ |
| Example 5 | 83 | 0.42 | 0.0 | 22 | 0.1 | 0.3 | ○ |
| Example 6 | 65 | 0.32 | 0.2 | 23 | 0.2 | 0.4 | ○ |
| Example 7 | 72 | 0.38 | 0.0 | 21 | 0.0 | 0.0 | ○ |
| Comparative Example 1 | 70 | 0.45 | 0.0 | 68 | 0.0 | 1.4 | ○ |
| Comparative Example 2 | 50 | 0.17 | 0.0 | 47 | 0.3 | 1.7 | ○ |
| Comparative Example 3 | 80 | 0.40 | 5.9 | 22 | 0.0 | 0.0 | ○ |
| Comparative Example 4 | 70 | 0.45 | 0.0 | 63 | 0.0 | 1.2 | ○ |
| Comparative Example 5 | 70 | 0.52 | 0.0 | 72 | 0.2 | 1.4 | ○ |
| Comparative Example 6 | 76 | 3.40 | | | — | | ○ |
| Conventional Example 1 | 40 | 0.05 | 0.0 | 98 | 0.0 | 0.0 | X |
| Conventional Example 2 | 45 | 0.06 | 0.0 | 110 | 0.0 | 0.0 | X |
| Example 4 | 70 | 0.90 | 0.0 | 69 | 0.2 | 1.1 | ○ |
| Conventional Example 5 | 72 | 2.00 | 0.0 | 125 | 0.0 | 0.0 | ○ |

The separator of Example 1 was 25 μm thick and had a density of 0.43 g/cm³. The results show that the lithium-ion secondary battery produced using this separator had satisfactory performance. The separator of Comparative Example 1 was 25 μm thick and had a density of 0.43 g/cm³. The lithium-ion secondary battery obtained using the separator of Comparative Example 1 had an internal resistance of 68 mΩ, which was higher than that of the lithium-ion secondary battery obtained using the separator of Example 1. This is because the content of fibers 0.03 to 0.50 μm in diameter was 85.2% by mass, which was lower than that of Example 1, resulting in a greater content of thick fibers. It appears that the ion conduction path was longer and the resistance was poorer where the fibers were thicker, resulting in poor internal battery resistance.

The results of Example 1 and Comparative Example 1 thus show that the content of fibers 0.03 to 0.50 μm in diameter should preferably fall within the range of 90% by mass or more.

The separator of Example 2 was 30 μm thick and had a density of 0.72 g/cm³. The results show that the lithium-ion secondary battery produced using this separator had satisfactory performance. The separator of Comparative Example 2 was 30 μm thick and had a density of 0.72 g/cm³. The lithium-ion secondary battery obtained using the separator of Comparative Example 2 had a short failure rate of 0.3% and an overcharging failure rate of 1.7% compared with the lithium-ion secondary battery obtained using the separator of Example 2. The proportion of the number of fibers 0.05 mm to less than 0.20 mm in length was 17.9%, lower than that of Example 2, thus suggesting that a long fiber content greater than the short fiber content resulted in a loss of separator shielding properties, leading to short failures and overcharging failures.

The separator of Example 3 was 17 μm thick and had a density of 0.29 g/cm³. The results show that the lithium-ion secondary battery produced using this separator had satisfactory performance. The separator of Comparative Example 3 was similarly 17 μm thick and had a density of 0.29 g/cm³. The lithium-ion secondary battery obtained using the separator of Comparative Example 3 had a winding failure rate of 5.9% compared with the lithium-ion secondary battery obtained using the separator of Example 3. The proportion of the number of fibers 0.05 mm to less than 0.20 mm in length was 32.7%, greater than that of Example 3, suggesting that the increase in short fibers resulted in less interlacing of long fibers and thus a loss of separator strength and winding failure due to separator breakage during the battery production process.

The results for Example 2 and Comparative Example 2 as well as Example 3 and Comparative Example 3 show that the proportion of the number of fibers 0.05 mm to less than 0.20 mm in length should preferably fall within the range of 20 to 30% and that the proportion of the number of fibers 0.20 to 5.00 mm in length should preferably fall within the range of 70 to 80%.

The separator of Example 4 was 32 μm thick and had a density of 0.75 g/cm³. The results show that the lithium-ion secondary battery produced using this separator had satisfactory performance. Comparison of Example 4 with Example 2 revealed that the lithium-ion secondary battery obtained using the separator of Example 2 had a lower internal resistance. This suggests that Example 2 had better ion conduction because it was thinner, had higher porosity, and had a greater maximum pore diameter than the separator of Example 4. Comparison of Example 4 with Example 2 revealed that the separator of Example 2 had a lower winding failure rate. This suggests that Example 2 had a more uniform texture and fewer places with less local interlacing of fibers because the average fiber length was shorter than that of Example 4.

The separator of Example 5 was 17 μm thick and had a density of 0.25 g/cm³. The results show that the lithium-ion secondary battery produced using this separator had satisfactory performance. Comparison of Example 5 with Example 3 revealed that the lithium-ion secondary battery obtained using the separator of Example 3 had no short failures or winding failures. This suggests that the separator shielding properties were better because the separator of Example 3 had a lower porosity and a smaller maximum pore diameter than the separator of Example 5.

The separators of Examples 6 and 7 were 8 μm and 10 μm thick, respectively, and had a density of 0.50 g/cm³ and 0.40 g/cm³, respectively. The results show that the lithium-ion secondary batteries produced using these separators had satisfactory performance. Comparison of Example 6 with Example 7 revealed that the lithium-ion secondary battery obtained using the separator of Example 7 had no short failures or winding failures. This suggests that the separator shielding properties were better because the separator of Example 7 was thicker than the separator of Example 6. Comparison of Example 6 with Example 7 revealed there were no winding failures in Example 7. This suggests that there was more interlacing between long fibers and better separator strength because the separator of Example 7 had a longer average fiber length and more long fibers than the separator of Example 6.

The separator of Comparative Example 4, as in Example 1, was 25 μm thick, had a density of 0.43 g/cm³, and had a basis weight of 10.8 g/m². The lithium-ion secondary battery obtained using the separator of Comparative Example 4 had an internal resistance of 63 mΩ, which was higher than that of the lithium-ion secondary battery obtained using the separator of Example 1. This was attributed to the inclusion of the beaten, solvent-spun regenerated cellulose fibers, the trunk portion of which is thick. The content of fibers 0.03 to 0.50 μm in diameter was a low content of 74.1% by mass. It appears that the ion conduction path was longer and the resistance was poorer where the fibers were thicker, resulting in poor internal battery resistance.

The separator of Comparative Example 5, as in Example 1, was 25 μm thick, had a density of 0.43 g/cm³, and had a basis weight of 10.8 g/m². The lithium-ion secondary battery obtained using the separator of Comparative Example 5 had an internal resistance of 72 mΩ, which was higher than that of the lithium-ion secondary battery obtained using the separator of Example 1. This was attributed to the inclusion of PET fibers 3 μm in diameter. The content of fibers 0.03 to 0.50 μm in diameter was a low content of 83.7% by mass. It appears that the ion conduction path was longer and the resistance was poorer where the fibers were thicker, resulting in poor internal battery resistance.

In the separator of Comparative Example 6, the proportion of the number of fibers 0.05 mm to less than 0.20 mm in length was 0%, with no microfibers. This was attributed to the meta-aramid fibers. The para-system has a molecular structure characterized by good crystallinity, with linearly distributed benzene rings, whereas the molecular structure of the meta-system is characterized by bent molecular chains and is thus considered to be unrefined. As a result, the separator of Comparative Example 6 had low strength and frequent winding failures, so no battery tests were conducted.

The separator of Conventional Example 1 was a microporous polyethylene film, and the separator of Conventional Example 2 was a microporous polypropylene film with few voids. The lithium-ion secondary batteries obtained using the separators of Conventional Examples 1 and 2 had poor internal battery resistance compared with the lithium-ion secondary batteries obtained using the separators of the Examples. All samples of lithium-ion secondary batteries obtained using the separator of Conventional Example 1 also ignited and began to smoke in the heat resistance test. The heat resistance test was conducted under extreme conditions above the melting point of polyethylene, thus presumably causing the separators to completely melt until there were no longer any separators between the electrodes, resulting in internal short circuiting and ignition/smoking. All samples of the lithium-ion batteries obtained using the separator of Conventional Example 2 also ignited and began to smoke in the heat resistance test. Polypropylene has better heat resistance than polyethylene, but the test was conducted under extreme conditions above the melting point, resulting in internal short circuiting and ignition/smoking in the same manner as Conventional Example 1.

The separator of Conventional Example 3 was composed of beaten solvent-spun regenerated cellulose fibers. However, the content of the fibers 0.03 to 0.50 μm in diameter, 37.5% by mass, was lower than in the Examples, and thick fibers were sporadically seen. The lithium-ion secondary battery obtained using Conventional Example 3 thus had poor internal battery resistance compared with the lithium-ion secondary batteries obtained using the separators of the Examples. There were no problems in the heat resistance test, but disassembly of the batteries after the test revealed discolored separators. Long-term stability was thus a concern.

The use of aramid fibrids in the separator of Conventional Example 4 resulted in high shielding properties. However, fibrids come into close contact with each other and close up voids, resulting in a reduced ion conduction path. The lithium-ion secondary battery obtained using Conventional Example 4 thus had far worse internal battery resistance compared with the lithium-ion secondary batteries obtained using the separators of the Examples.

As noted above, according to the present embodiment, para-amid fibers are used, and the fiber diameter and the proportion of microfibers are controlled, thereby making it possible to provide a separator for a heat-resistant lithium-ion secondary battery that has low resistance yet exceptional strength and shielding properties, where the rapid generation of heat in the battery will not lead to thermal runaway. The separator can also be used to achieve faster charging/discharging, a higher capacity and a longer life, and better safety against explosion or ignition in lithium-ion secondary batteries.

The invention claimed is:

1. A separator for an electrochemical element that comprises 80% by mass or more para-aramid fibers for retaining an electrolyte and that is interposed between a pair of electrodes, characterized in that the content of the para-aramid fibers that are 0.03 to 0.50 μm in diameter is 90% by mass or more, the proportion of the number of the para-aramid fibers that are 0.05 mm to less than 0.20 mm in length is 20 to 30%, and the proportion of the number of the para-aramid fibers that are 0.20 mm to less than 5.00 mm in length is 70 to 80%.

2. The separator for an electrochemical element as claimed in claim 1, which is 10 to 30 μm thick.

3. The separator for an electrochemical element as claimed in claim 1 having a porosity that is 50 to 80%.

4. The separator for an electrochemical element as claimed in claim 1, having a maximum pore diameter of 0.15 to 0.40 μm.

5. The separator for an electrochemical element as claimed in claim 1, having a mean fiber length of 0.7 to 1.0 mm.

6. An electrochemical device, comprising the separator for an electrochemical element as claimed in claim 1.

7. The electrochemical device as claimed in claim 6, which is a lithium-ion secondary battery.

* * * * *